Aug. 15, 1939.  C. S. ROBINSON  2,169,432
AERIAL CAMERA MOUNT
Filed July 7, 1938  2 Sheets-Sheet 1

INVENTOR.
Cecil S. Robinson
BY
Robert V. Morse
ATTORNEY.

Aug. 15, 1939.   C. S. ROBINSON   2,169,432
AERIAL CAMERA MOUNT
Filed July 7, 1938   2 Sheets-Sheet 2

INVENTOR.
Cecil S. Robinson
BY Robert V. Morse
ATTORNEY.

Patented Aug. 15, 1939

2,169,432

UNITED STATES PATENT OFFICE 2,169,432

AERIAL CAMERA MOUNT

Cecil S. Robinson, Ithaca, N. Y.

Application July 7, 1938, Serial No. 218,034

7 Claims. (Cl. 248—179)

This invention relates to aerial camera mounts, by which cameras such as used in aerial photography are supported in aircraft, usually with the camera pointing downward and taking its pictures through an opening in the floor of the airplane. It is essential in such devices, particularly in aerial surveys, that the camera be so mounted that it can be tilted at moderate angles in any direction, to permit the operator to accurately follow lines on the ground regardless of the tilting of the airplane, and it is also essential that the camera be well cushioned against vibration, in order to obtain clear pictures.

In the past, gimbal rings with metallic pivot bearings mounted at right angles as in a universal joint have been provided to permit tilting the camera; and independent rubber cushions mounted elsewhere have been used to absorb vibrations, the most common construction have metallic gimbal bearings fore and aft and cross-wise of the camera for tilting, and rubber cushions diagonally at the four corners of an outer frame to absorb vibration.

I have found from experience that mounts having metallic gimbal bearings as described are not entirely satisfactory for accurate work, as the operator sometimes feels variations in resistance as he endeavors to steady the camera by hand, the variation being probably due to differences between friction of rest and friction of motion. One object of the present invention is to provide a mount having a perfectly smooth gradation of resistance for even the slighest motions, while being capable of large angular motions if necessary, and one which will return to a neutral position when released. Another object is to so locate the elastic cushions that they may serve the double purpose of gimbal pivots and shock absorbers, thus eliminating half the elements previously required, and at the same time obtaining an improved result. A third object is to provide readily adjustable means for neutralizing the angle of incidence of the airplane at various altitudes. Various other objects will become apparent as the description proceeds.

Referring now to the drawings.

Similar reference numerals refer to similar parts throughout the various views.

Figure 1:
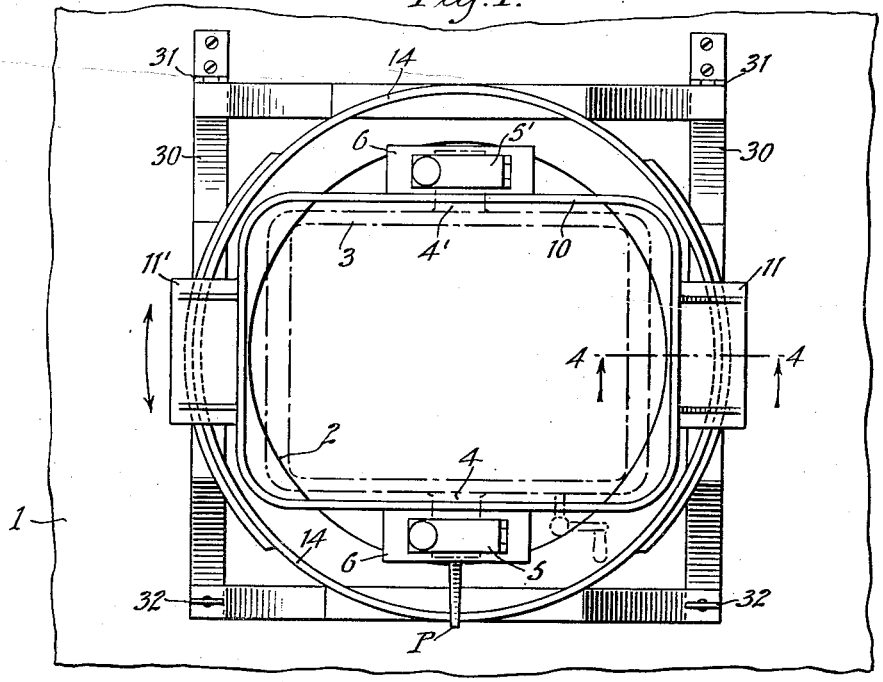
Fig. 1 is a plan view of the camera mount, showing the elastic pivots at right angles on axes passing through the center of the camera, so that it may be tilted with a minimum of elastic compression.
Figure 2:
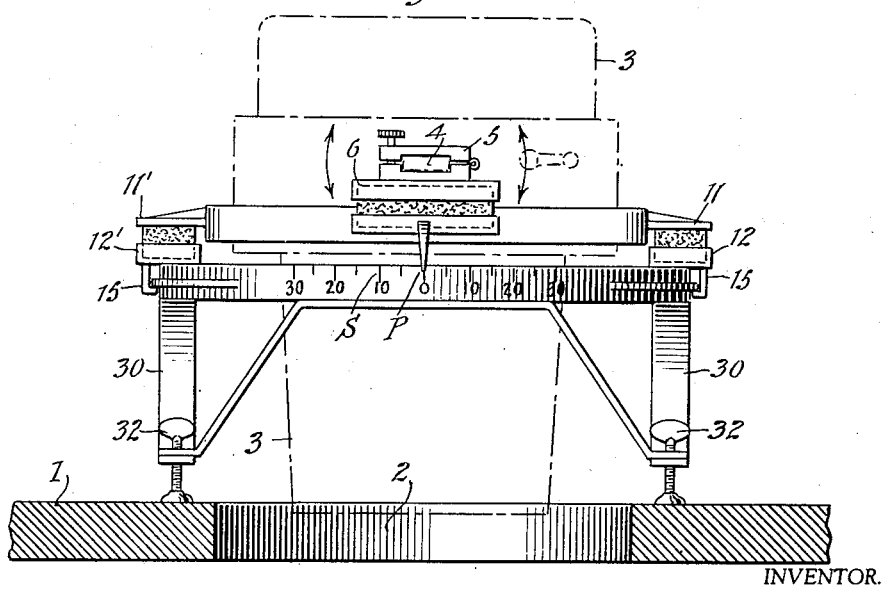
Fig. 2 is a rear elevation showing the drift scale, and with the camera indicated by broken lines.
Figure 3:
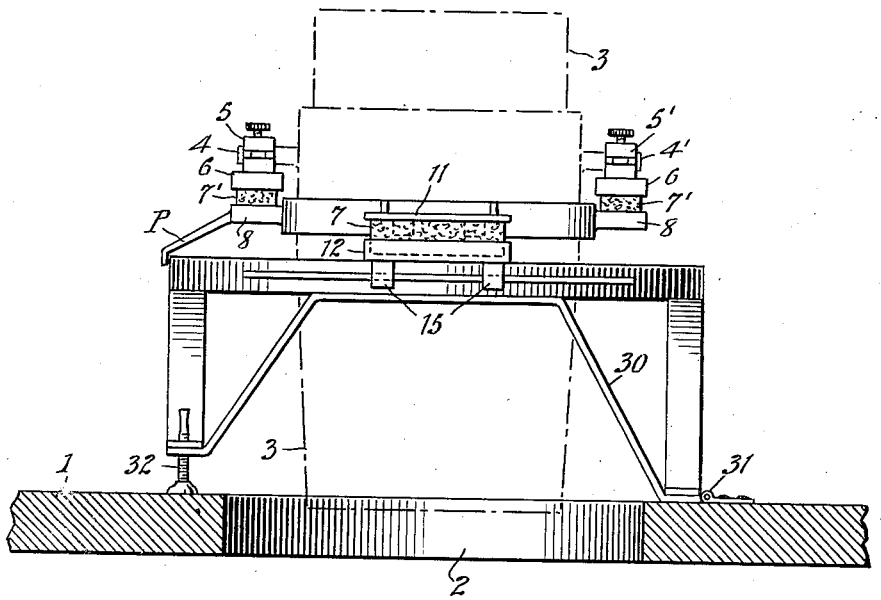
Fig. 3 is a side elevation, showing the adjusting screws on the legs for longitudinal trim, and with the camera indicated by broken lines.

In the drawings, the floor or fuselage of an airplane is indicated by the reference numeral 1, and this floor may be provided with an opening 2, through which photographs can be taken by means of the camera 3 (indicated by broken lines). Such aerial cameras are well known in the art, and the present invention is not concerned with their details, except as to the form of mounting in which the camera is supported.

In order to mount the camera in such a manner as to provide universal tilting, smooth and steady control of direction, and freedom from vibration, the camera 3 is provided with a pair of supporting members 4, 4', corresponding to trunnions or pivot members, these members 4, 4' being arranged on a line passing approximately through the center of the camera, and preferably somewhat above its center of gravity. The supporting members 4 and 4' are secured in clamps 5 and 5', which are provided with flange plates 6 resting on cushions 7. The cushions 7 are of sponge rubber or other yielding material of suitable elastic properties, and are set on base plates 8, which are spaced sufficiently below the plates 6 to permit ample tilting of the camera, without the plates 6 and 8 striking each other, the tilting being permitted by the elasticity of the cushions 7.

The plates 8 are rigidly fastened to a rectangular frame 10 which extends around the camera 3, but is spaced therefrom sufficiently to allow it to tilt as described on the axis 4, 4'. The frame 10 is provided with flange plates 11, 11', located on an axis substantially at right angles to the axis 4, 4', and with the axis 11, 11' passing substantially through the center of the camera 3, and preferably above the camera's center of gravity. The flange plates 11, 11' rest on cushions 7', similar to the cushions 7 previously described, and these cushions 7' are supported on base plates 12 resting on an azimuth ring 14. The plates 12 are arranged to slide along the top of the ring 14 so as to give an adjustment in azimuth to correct for the drift of the airplane when flying in a cross-wind. A pointer P is provided to read on a suitable azimuth scale S.

Figure 4:
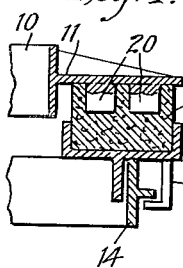
Fig. 4 is a detail view showing one manner of securing the elastic pivot cushions.
Figure 5:
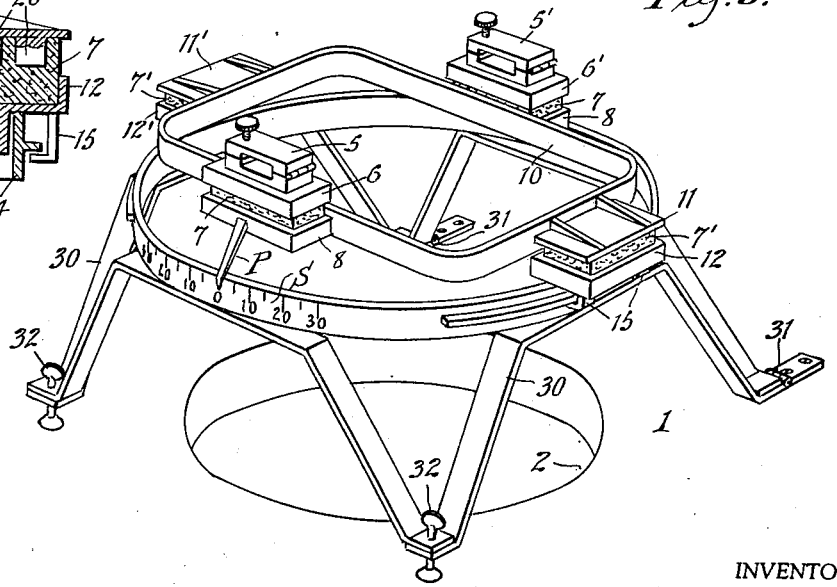
Fig. 5 is a perspective view of the camera supporting means and elastic pivots.

One manner of holding the pivot cushion assembly 11, 7, 12 on the ring 14 is shown in greater detail in Fig. 4, which shows the retaining hook 15, attached to the base plate 12, extending below and partially around the ring 14 so as to prevent the assembly from falling off the ring 14 in case of inverted position. This Fig. 4 also shows in greater detail the manner of securing the cushions 7 and 7' to the flange and base plates 6, 8, and 11, 12, so that the cushions will not slide out of place. This is accomplished by cementing the cushions to the flanges and base plates, and by also providing dowels or tongue projections 20 which are embedded in the cushions to prevent slipping. Any other suitable securing means may of course be provided, as will be apparent to those skilled in the art.

The azimuth ring 14 is rigidly mounted on four legs, of which the forward pair 30 is hinged at 31 to the floor of the airplane 1; and the rear pair of legs are provided with vertical adjusting screws 32. These screws 32 permit the leveling of the ring 14 and camera mount in a fore and aft direction to neutralize the flying angle of the airplane, which varies for different altitudes and flying conditions. This can usually be set for a given flight, and thereafter the man in control of the camera holds the camera on the line to be photographed by tilting it on the cushioned axes 4, 4' and 11, 11', as described.

It will be noted that such tilting control, by virtue of the present invention, is not subject to any of the abrupt gradations of friction sometimes felt in mechanical pivots, but provides a smooth action whether the angle of tilt is small or large, and also a slight cushioned resistance or tendency to return which assists effective steadying by the human hand.

While I have in the foregoing described a certain specific form by way of example, it will be understood that it is merely for purposes of illustration, to make clear the principles of the invention, which is not limited to the particular forms shown, but is susceptible to various modifications and adaptations in different installations, as will be apparent to those skilled in the art, without departing from the scope of the invention as stated in the following claims.

I claim:

1. An aerial camera mount, comprising in combination a pair of members composed of elastic material comprising a pivotal axis, the camera being carried by said members so as to be capable of tilting substantially about said axis with relatively slight distortion of the elastic material, a movable frame connected to said members, a second pair of members of elastic material connected to said frame at an angle to said first pair of members, so as to form a universal mounting, and means for rotating the mounting in azimuth.

2. An aerial camera mount, comprising in combination a pair of members composed of elastic material comprising a pivotal axis, the camera being carried by said members so as to be capable of tilting substantially about the said axis with relatively slight distortion of the elastic material, a movable frame connected to said members, a second pair of members of elastic material connected to said frame at an angle to said first pair of members, so as to form a universal mounting, and means for adjusting the mount to compensate various angles of incidence.

3. In an aerial camera mount, the combination of a pair of elastic pads adapted to be attached to the camera, a movable frame attached to said pads, a second pair of elastic pads attached to said frame transversely to the axis of the first pair of pads, whereby the camera may be tilted with relatively slight distortion of the elastic pads.

4. In an aerial camera mount, the combination of a camera, supporting members on said camera, a frame movable relative to said camera, elastic means acting as pivots between said frame and the camera, a bearing member movable in azimuth, a second set of elastic means acting as pivots between said bearing member and the frame, the pivotal axis of the first mentioned elastic means being transverse to the pivotal axis of the second elastic means whereby the camera is mounted to tilt universally on elastic pivot means with the mounting bodily movable in azimuth.

5. In an aerial camera mount, the combination of a camera, supporting members on said camera, a frame movable relative to said camera, elastic means acting as pivots between said frame and the camera, a bearing member movable in azimuth, a second set of elastic means acting as pivots between said bearing member and the frame, the pivotal axis of the first mentioned elastic means being transverse to the pivotal axis of the second elastic means whereby the camera is mounted to tilt universally on elastic pivot means with the mounting bodily movable in azimuth, and means for adjusting the mount to compensate various angles of incidence.

6. An aerial camera mount comprising in combination a base, screw means for adjusting said base to compensate various angles of incidence, an azimuth frame upon which the camera may be adjusted for drift, a pair of elastic members acting as pivots movably mounted on said azimuth frame, a tiltable frame mounted on said elastic members, a second pair of elastic members acting as pivots mounted on said tiltable frame transversely to the first mentioned elastic members, and means secured to the camera and carried by said second pair of elastic means, whereby the camera may be tilted universally with relatively slight distortion of the elastic members.

7. In a camera mount, the combination of two pairs of elastic members acting as pivots having their axes transverse to each other, a rigid tiltable frame connecting one pair to the other, so that one pair can tilt its axis relative to the other pair, and means for mounting a camera on said members, whereby it is both cushioned and universally mounted on the same elastic members.

CECIL S. ROBINSON.